US012020561B2

(12) United States Patent
Dimberg et al.

(10) Patent No.: US 12,020,561 B2
(45) **Date of Patent: *Jun. 25, 2024**

(54) BATTERY-POWERED RETROFIT REMOTE CONTROL DEVICE

(71) Applicant: Lutron Technology Company LLC, Coopersburg, PA (US)

(72) Inventors: Chris Dimberg, Easton, PA (US); Matthew Philip McDonald, Phoenixville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,523

(22) Filed: May 1, 2023

(65) Prior Publication Data

US 2023/0267826 A1 Aug. 24, 2023

Related U.S. Application Data

(63) Continuation of application No. 17/345,967, filed on Jun. 11, 2021, now Pat. No. 11,657,702, which is a continuation of application No. 15/464,230, filed on Mar. 20, 2017, now Pat. No. 11,043,115, which is a continuation of application No. 14/748,906, filed on Jun. 24, 2015, now Pat. No. 9,633,557.

(60) Provisional application No. 62/016,396, filed on Jun. 24, 2014.

(51) Int. Cl.
*G08C 17/02* (2006.01)

(52) U.S. Cl.
CPC ......... *G08C 17/02* (2013.01); *G08C 2201/12* (2013.01)

(58) Field of Classification Search
CPC .......... H01H 3/02; H05B 37/02; G08C 17/02; G08C 2201/12; H02J 17/00
USPC ................. 340/12.5; 307/104, 143; 315/246; 29/825
See application file for complete search history.

(56) References Cited

U.S. PATENT DOCUMENTS

| | | | |
|---|---|---|---|
| 3,032,688 | A | 5/1962 | Spira |
| 5,099,193 | A | 3/1992 | Moseley et al. |
| 5,162,665 | A | 11/1992 | Troyen et al. |

(Continued)

FOREIGN PATENT DOCUMENTS

| | | | |
|---|---|---|---|
| CN | 2596671 | Y | 12/2003 |
| GB | 2485805 | A | 5/2012 |

(Continued)

*Primary Examiner* — Nam V Nguyen
(74) *Attorney, Agent, or Firm* — Flaster Greenberg PC

(57) ABSTRACT

A remote control device may be configured to be mounted over the toggle actuator of a light switch and to control a load control device. The remote control device may include a base portion and a rotating portion supported by the base portion so as to be rotatable about the base portion. The remote control device may include a control circuit, a wireless communication circuit, and a rotary encoder circuit. The rotary encoder circuit may be configured to translate a force applied to the rotating portion into input signals, and to operate as an antenna of the remote control device. The rotary encoder circuit may be configured to provide the input signals to the control circuit. The control circuit may be configured to translate the one or more input signals into control signals for transmission to the load control device via the wireless communication circuit.

20 Claims, 7 Drawing Sheets

(56) References Cited

U.S. PATENT DOCUMENTS

| | | | |
|---|---|---|---|
| 5,189,412 | A | 2/1993 | Mehta et al. |
| 5,239,205 | A | 8/1993 | Hoffman et al. |
| 5,264,761 | A | 11/1993 | Johnson et al. |
| 5,281,699 | A | 1/1994 | Chang |
| 5,340,954 | A | 8/1994 | Hoffman et al. |
| 5,458,311 | A | 10/1995 | Holbrook |
| 5,739,775 | A | 4/1998 | Brandestini |
| 5,744,913 | A | 4/1998 | Martich et al. |
| 5,818,128 | A | 10/1998 | Hoffman et al. |
| 5,905,442 | A | 5/1999 | Mosebrook et al. |
| 5,955,796 | A | 9/1999 | Nilssen |
| 5,962,992 | A | 10/1999 | Huang et al. |
| 5,995,796 | A | 11/1999 | Schlueter et al. |
| 6,270,239 | B1 | 8/2001 | Sund et al. |
| 6,389,139 | B1 | 5/2002 | Curtis et al. |
| 6,400,103 | B1 | 6/2002 | Adamson |
| 6,528,954 | B1 | 3/2003 | Lys et al. |
| 6,608,253 | B1 | 8/2003 | Rintz et al. |
| 6,784,383 | B2 | 8/2004 | Sugahara et al. |
| 6,828,517 | B2 | 12/2004 | Elzey et al. |
| 6,828,733 | B1 | 12/2004 | Crenshaw et al. |
| 7,092,772 | B2 | 8/2006 | Murray et al. |
| 7,161,311 | B2 | 1/2007 | Mueller et al. |
| 7,462,997 | B2 | 12/2008 | Mueller et al. |
| 7,486,883 | B2 | 2/2009 | McNary |
| 7,573,208 | B2 | 8/2009 | Newman et al. |
| 7,597,455 | B2 | 10/2009 | Smith et al. |
| 7,623,010 | B2 | 11/2009 | Liu |
| 7,791,289 | B2 | 9/2010 | Oosterbaan et al. |
| 7,834,856 | B2 | 11/2010 | Grinshpoon et al. |
| 7,872,423 | B2 | 1/2011 | Biery et al. |
| 7,940,167 | B2 | 5/2011 | Steiner et al. |
| 8,008,866 | B2 | 8/2011 | Newman et al. |
| 8,009,042 | B2 | 8/2011 | Steiner et al. |
| 8,013,545 | B2 | 9/2011 | Jonsson |
| 8,033,686 | B2 | 10/2011 | Recker et al. |
| 8,084,700 | B1 | 12/2011 | Massaro et al. |
| 8,120,279 | B2 | 2/2012 | Oosterbaan et al. |
| 8,124,898 | B2 | 2/2012 | Mathew et al. |
| 8,199,010 | B2 | 6/2012 | Sloan et al. |
| 8,212,486 | B2 | 7/2012 | Biery et al. |
| 8,217,915 | B2 | 7/2012 | Philipp |
| 8,228,184 | B2 | 7/2012 | Blakeley et al. |
| 8,274,233 | B2 | 9/2012 | Jacoby et al. |
| 8,330,638 | B2 | 12/2012 | Altonen et al. |
| 8,344,639 | B1 | 1/2013 | Bahrehmand et al. |
| 8,350,648 | B2 | 1/2013 | Cueto |
| 8,362,713 | B2 | 1/2013 | Recker et al. |
| 8,363,713 | B2 | 1/2013 | Chuang |
| 8,384,293 | B2 | 2/2013 | Liao et al. |
| 8,410,706 | B2 | 4/2013 | Steiner et al. |
| 8,427,061 | B2 | 4/2013 | Biery et al. |
| 8,451,116 | B2 | 5/2013 | Steiner et al. |
| 8,508,148 | B1 | 8/2013 | Carley et al. |
| 8,575,851 | B1 | 11/2013 | Bahrehmand et al. |
| 8,669,484 | B1 | 3/2014 | Benson |
| 8,758,031 | B2 | 6/2014 | Cheng et al. |
| 8,786,196 | B2 | 7/2014 | Biery et al. |
| 8,823,266 | B2 | 9/2014 | Qin |
| 9,122,320 | B1 | 9/2015 | Rowles et al. |
| 9,148,937 | B2 | 9/2015 | Steiner et al. |
| 9,208,965 | B2 | 12/2015 | Busby et al. |
| 9,250,669 | B2 | 2/2016 | Blakeley et al. |
| 9,418,802 | B2 | 8/2016 | Romano et al. |
| 9,520,247 | B1 | 12/2016 | Finnegan et al. |
| 9,544,977 | B2 | 1/2017 | Economy et al. |
| 9,565,742 | B2 | 2/2017 | Raneri et al. |
| 9,583,288 | B2 | 2/2017 | Jones et al. |
| 9,633,557 | B2 | 4/2017 | Twaddell et al. |
| 9,799,469 | B2 | 10/2017 | Bailey et al. |
| 9,959,997 | B2 | 5/2018 | Bailey et al. |
| 10,548,205 | B2 * | 1/2020 | Dimberg .............. H01H 25/065 |
| 10,721,811 | B2 * | 7/2020 | Dimberg ................ G08C 17/02 |
| 11,043,115 | B2 | 6/2021 | Dimberg et al. |
| 11,657,702 | B2 * | 5/2023 | Dimberg ................ G08C 17/02 340/12.5 |
| 2002/0154025 | A1 | 10/2002 | Ling |
| 2002/0195975 | A1 | 12/2002 | Schanberger et al. |
| 2005/0077837 | A1 | 4/2005 | Kim et al. |
| 2005/0285538 | A1 | 12/2005 | Jaworski et al. |
| 2006/0273741 | A1 | 12/2006 | Stalker et al. |
| 2007/0145915 | A1 | 6/2007 | Roberge et al. |
| 2008/0111491 | A1 | 5/2008 | Spira et al. |
| 2008/0302873 | A1 | 12/2008 | Kotlarsky et al. |
| 2008/0303661 | A1 | 12/2008 | Chick |
| 2008/0315798 | A1 | 12/2008 | Diederiks et al. |
| 2009/0059603 | A1 | 3/2009 | Recker et al. |
| 2009/0069081 | A1 | 3/2009 | Thorner |
| 2009/0184652 | A1 | 7/2009 | Bollinger et al. |
| 2009/0206769 | A1 | 8/2009 | Biery et al. |
| 2009/0206983 | A1 | 8/2009 | Knode et al. |
| 2009/0251352 | A1 | 10/2009 | Altonen et al. |
| 2009/0288937 | A1 | 11/2009 | Agronin et al. |
| 2010/0188009 | A1 | 7/2010 | Bull |
| 2010/0255706 | A1 | 10/2010 | Hsiao et al. |
| 2010/0271802 | A1 | 10/2010 | Recker et al. |
| 2010/0295484 | A1 | 11/2010 | Smith |
| 2010/0308664 | A1 | 12/2010 | Face et al. |
| 2010/0327766 | A1 | 12/2010 | Recker et al. |
| 2011/0080114 | A1 | 4/2011 | Elberbaum et al. |
| 2011/0095687 | A1 | 4/2011 | Jonsson |
| 2011/0095709 | A1 | 4/2011 | Diehl et al. |
| 2011/0098953 | A1 | 4/2011 | Jonsson |
| 2011/0133655 | A1 | 6/2011 | Recker et al. |
| 2011/0162946 | A1 | 7/2011 | Altonen et al. |
| 2011/0187282 | A1 | 8/2011 | Biery et al. |
| 2012/0025717 | A1 | 2/2012 | Klusmann et al. |
| 2012/0068611 | A1 | 3/2012 | Steiner et al. |
| 2012/0080944 | A1 | 4/2012 | Recker et al. |
| 2012/0136485 | A1 | 5/2012 | Weber et al. |
| 2012/0163828 | A1 | 6/2012 | Lindberg et al. |
| 2012/0187835 | A1 | 7/2012 | Jonsson |
| 2012/0280793 | A1 | 11/2012 | Fayfield et al. |
| 2012/0286672 | A1 | 11/2012 | Holland et al. |
| 2012/0286689 | A1 | 11/2012 | Newman et al. |
| 2012/0286940 | A1 | 11/2012 | Carmen et al. |
| 2012/0292174 | A1 | 11/2012 | Mah et al. |
| 2012/0306376 | A1 | 12/2012 | Altonen et al. |
| 2013/0010018 | A1 | 1/2013 | Economy |
| 2013/0026947 | A1 | 1/2013 | Economy et al. |
| 2013/0181630 | A1 | 7/2013 | Taipale et al. |
| 2013/0222122 | A1 | 8/2013 | Killo et al. |
| 2013/0257315 | A1 | 10/2013 | Restrepo et al. |
| 2014/0001977 | A1 | 1/2014 | Zacharchuk et al. |
| 2014/0117859 | A1 | 5/2014 | Swatsky et al. |
| 2014/0117871 | A1 | 5/2014 | Swatsky et al. |
| 2015/0077021 | A1 | 3/2015 | McCarthy et al. |
| 2015/0123681 | A1 | 5/2015 | Park |
| 2015/0373796 | A1 | 12/2015 | Bahrehmand |
| 2016/0073479 | A1 | 3/2016 | Erchak et al. |
| 2017/0071049 | A1 | 3/2017 | Swatsky et al. |
| 2017/0105176 | A1 | 4/2017 | Finnegan et al. |
| 2018/0190451 | A1 | 7/2018 | Scruggs |

FOREIGN PATENT DOCUMENTS

| | | | |
|---|---|---|---|
| JP | 2007242566 | A | 9/2007 |
| WO | 2002025842 | A2 | 3/2002 |
| WO | 2007072296 | A1 | 6/2007 |

* cited by examiner

BATTERY-POWERED RETROFIT REMOTE CONTROL DEVICE

CROSS-REFERENCE TO RELATED APPLICATIONS

This application is a continuation of U.S. patent application Ser. No. 17/345,967, filed Jun. 11, 2021, which issued as U.S. Pat. No. 11,657,702 on May 23, 2023, which is a continuation of U.S. patent application Ser. No. 15/464,230, filed Mar. 20, 2017, which issued as U.S. Pat. No. 11,043, 115 on Jun. 22, 2021, which is a continuation of U.S. patent Application Ser. No. 14/748,906, filed Jun. 24, 2015, which issued as U.S. Pat. No. 9,633,557 on Apr. 25, 2017, which claims priority to U.S. Provisional Patent Application No. 62/016,396, filed Jun. 24, 2014, all of which are incorporated herein by reference in their respective entireties.

BACKGROUND

In accordance with prior art installations of load control systems, one or more standard mechanical toggle switches may be replaced by more advanced load control devices (e.g., dimmer switches). Such a load control device may operate to control an amount of power delivered from an alternative current (AC) power source to an electrical load.

The procedure of replacing a standard mechanical toggle switch with a load control device typically requires disconnecting electrical wiring, removing the mechanical toggle switch from an electrical wallbox, installing the load control device into the wallbox, and reconnecting the electrical wiring to the load control device.

Often, such a procedure is performed by an electrical contractor or other skilled installer. Average consumers may not feel comfortable undertaking the electrical wiring that is necessary to complete installation of a load control device. Accordingly, there is a need for a load control system that may be installed into an existing electrical system that has a mechanical toggle switch, without requiring any electrical wiring work.

SUMMARY

As described herein, a remote control device may provide a simple retrofit solution for an existing switched control system. Implementation of the remote control device, for example in an existing switched control system, may enable energy savings and/or advanced control features, for example without requiring any electrical re-wiring and/or without requiring the replacement of any existing mechanical switches.

The remote control device may be configured to associate with, and control, a load control device of a load control system, without requiring access to the electrical wiring of the load control system. An electrical load may be electrically connected to the load control device such that the remote control device may control an amount of power delivered to the electrical load, via the load control device.

The remote control device may be configured to be mounted over the toggle actuator of a mechanical switch that controls whether power is delivered to the electrical load. The remote control device may be configured to maintain the toggle actuator in an on position when mounted over the toggle actuator, such that a user of the remote control device is not able to mistakenly switch the toggle actuator to the off position, which may cause the electrical load to be unpowered such that the electrical load cannot be controlled by one or more remote control devices.

The remote control device may include a base portion that is configured to be mounted over the toggle actuator of the switch, and a rotating portion that is rotatably supported by the base portion. The remote control device may be configured such that the base portion does not actuate the actuator of the electrical load when a force is applied to the rotating portion.

The remote control device may include a rotary encoder circuit that translates one or more forces that are applied to the rotating portion into one or more input signals, and that operates as an antenna of the remote control device. The rotary encoder circuit may be configured to provide the one or more input signals to a control circuit of the remote control device. The control circuit may be configured to translate the one or more input signals into control signals for transmission to the load control device via a wireless communication circuit of the remote control device.

DETAILED DESCRIPTION

Figure 1:
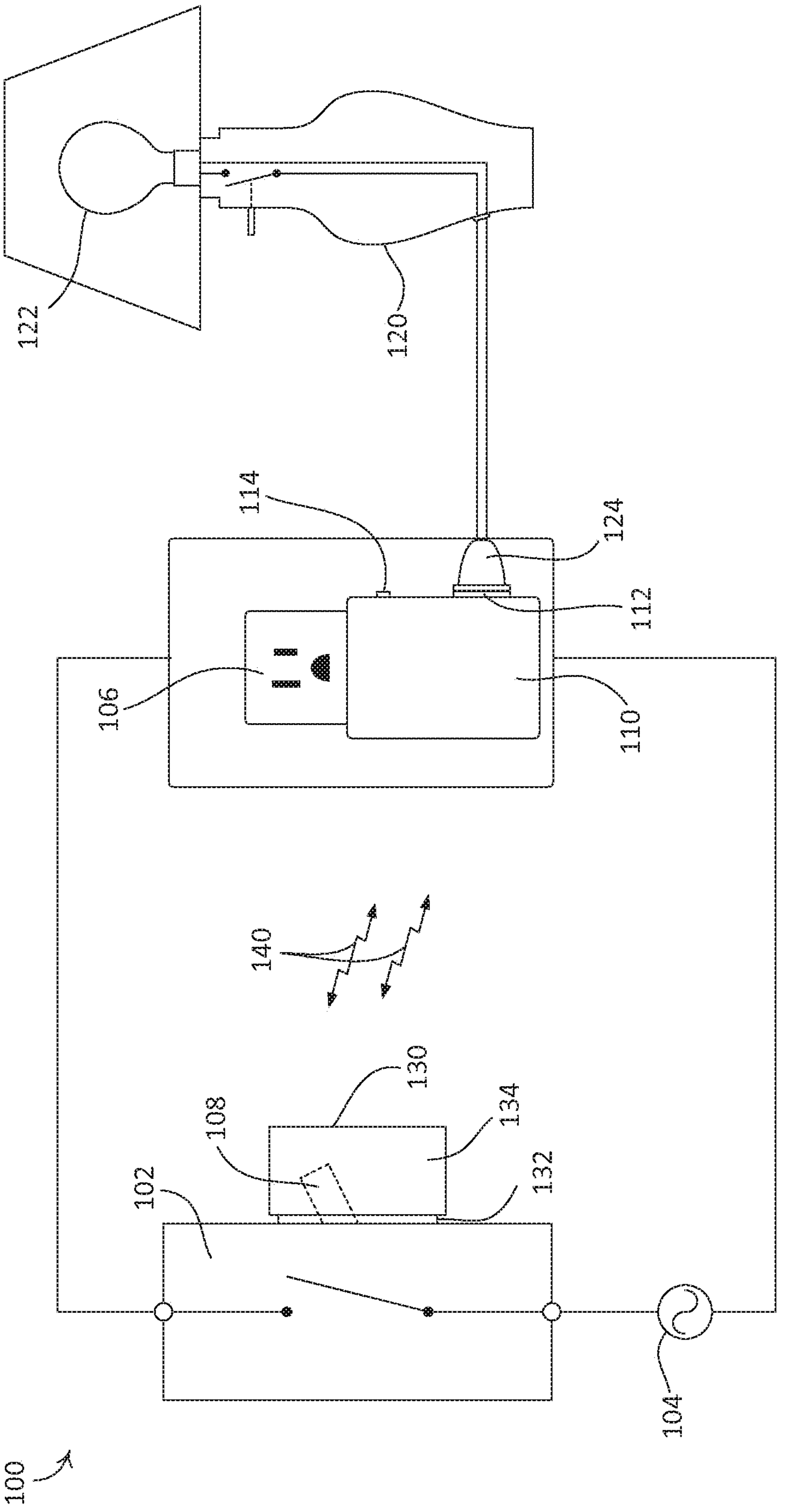
FIG. 1 depicts an example load control system that includes an example remote control device.

FIG. 1 depicts an example load control system 100. As shown, the load control system 100 is configured as a lighting control system that includes a load control device 110, a lamp 120, and a battery-powered remote control device 130, for example a rotary remote control device. The load control system 100 includes a standard, single pole single throw (SPST) maintained mechanical switch 102 that may be in place prior to installation of the remote control device 130 (e.g., pre-existing in the load control system 100). The switch 102 is coupled in series electrical connection between an alternating current (AC) power source 104 and an electrical outlet 106. The switch 102 includes a toggle actuator 108 that may be actuated to toggle, for example to turn on and/or turn off delivery of power to the electrical outlet 106. The electrical outlet 106 is electrically coupled to the AC power source 104 when the switch 102 is closed, and is disconnected from the AC power source 104 when the switch 102 is open.

As shown, the load control system 100 includes a plug-in load control device 110 (e.g., a "wall wart" plug-in device) that is configured to be plugged into a receptacle of a standard electrical outlet that is electrically connected to an AC power source (e.g., the electrical outlet 106). The plug-in load control device 110 may include one or more electrical receptacles. The illustrated plug-in load control device 110 includes an electrical receptacle 112 located on a side of the plug-in load control device 110. The plug-in load control device 110 may include an actuator 114 that may be actuated to associate the plug-in load control device 110 with the remote control device 130 during a configuration procedure of the load control system 100, such that the plug-in load control device 110 may then be responsive to the RF signals 140 transmitted by the remote control device 130.

The lamp 120 includes a lighting load 122 (e.g., an incandescent lamp, a halogen lamp, a compact fluorescent lamp, a light emitting diode (LED) lamp, or other screw-in lamp) and an electrical plug 124 that is configured to be plugged into an electrical outlet. As shown, the electrical plug 124 is plugged into the electrical receptacle 112 of the plug-in load control device 110 such that the plug-in load control device 110 may control the amount of power delivered to, and thus the intensity of, the lighting load 122 of the lamp 120. The lamp 120 is not limited to the illustrated table lamp configuration. For example, the lamp 120 may alternatively be configured as a floor lamp, a wall mounted lamp, or any other lighting load.

Figure 2B:
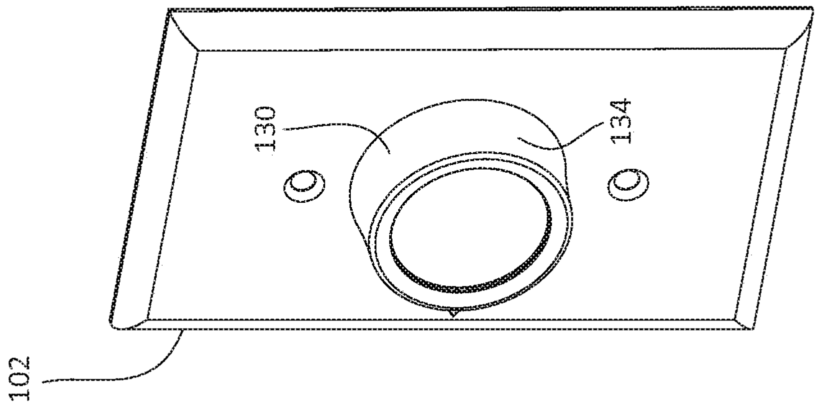
FIGS. 2A and 2B depict the example remote control device depicted in FIG. 1, in detached and attached positions, respectively, relative to the toggle actuator of a switch.
Figure 2A:
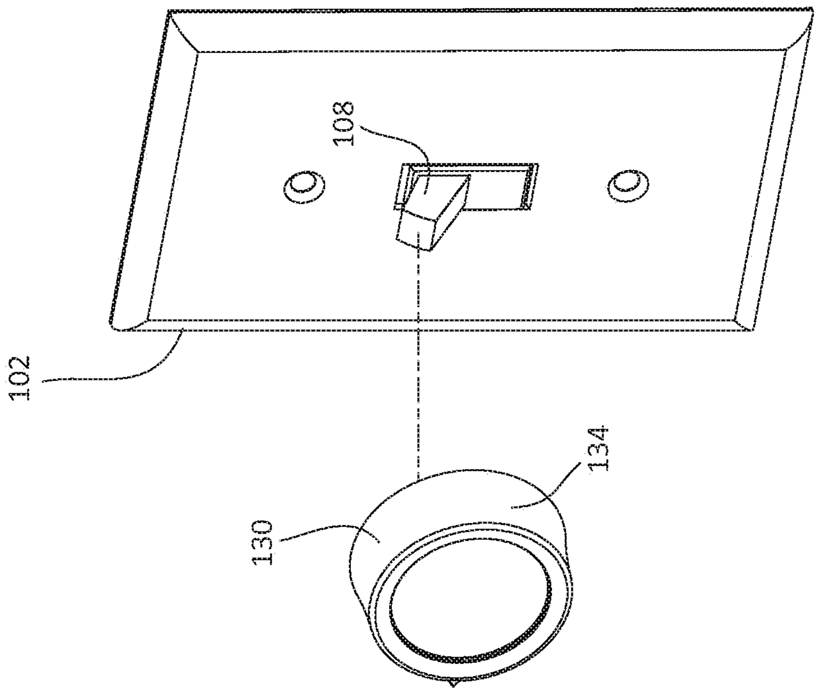

The remote control device 130 may be configured to be attached to the toggle actuator 108 of the switch 102 when the toggle actuator 108 is in the on position (e.g., typically pointing upward) and the switch 102 is closed and conductive. For example, FIGS. 2A and 2B illustrate the remote control device 130 before and after the remote control device 130 is mounted to the toggle actuator 108, respectively.

The remote control device 130 may include a base portion and an actuation portion that is operably coupled to the base portion. For example, as shown, the remote control device 130 includes a base portion 132 that is configured to be mounted over the toggle actuator 108 of the switch 102, and an actuation portion that is configured as a rotating portion 134. The illustrated rotating portion 134 is supported by the base portion 132 and is rotatable about the base portion 132. The base portion 132 may be configured to maintain the toggle actuator 108 in the on position. In this regard, the base portion 132 may be configured such that a user is not able to inadvertently switch the toggle actuator 108 to the off position when the remote control device 130 is attached to the switch 102.

The rotating portion 134 may be supported by the base portion 132 so as to be rotatable in opposed directions about the base portion 132, for example in the clockwise or counter-clockwise directions. The base portion 132 may be configured to be mounted over the toggle actuator 108 of the switch 102 such that the application of rotational movement to the rotating portion 134 does not actuate the toggle actuator 108. The remote control device 130 may be mounted to a toggle actuator that is in the on position and that is facing downward, while maintaining functionality of the remote control device 130. It should be appreciated that the remote control device 130 is not limited to mounting over the toggle actuator of an SPST mechanical switch, as shown. For example, the remote control device 130 may alternatively be configured to be mounted over other switch actuator geometries (e.g., a paddle type switch actuator that may be received through an opening of a Decorator faceplate). Components of the remote control device 130, such as the base portion 132 and the rotating portion 134, may be made of any suitable material, such as plastic.

The remote control device 130 may be configured to transmit one or more wireless communication signals, for example radio-frequency (RF) signals 140, to one or more devices associated with the load control system 100, such as the plug-in load control device 110. The remote control device 130 may include a wireless transmitter, such as a transceiver (not shown), via which one or more wireless communication signals may be sent.

The remote control device 130 may be configured to transmit wireless communication signals to the plug-in load control device 110 responsive to the application of rotational movements to the rotating portion 134. Such wireless communication signals may comprise control signals that are representative of commands to be executed by the load control device 110. For example, the remote control device 130 may be configured to, upon detecting rotational movement applied to the rotating portion 134, transmit signals to the load control device 110 that cause the load control device 110 to control an amount of power delivered to an attached electrical load (e.g., the lighting load 122). In this regard, the rotating portion 134 of the remote control device 130 may be operated to control, via the plug-in load control device 110, an intensity of the lighting load 122 between a low-end intensity (e.g., approximately 1%) and a high-end intensity (e.g., approximately 100%).

The remote control device 130 may be configured to detect (e.g., track) one or more characteristics associated with rotational movement applied to the rotating portion 134. For example, the remote control device 130 may be configured to detect the respective rotational distance and/or speed (e.g., rotational distance as a function of time) of rotational movements applied to the rotating portion 134. To illustrate, the remote control device 130 may detect the speed of a rotational movement applied to the rotating portion 134, and may transmit one or more control signals to the plug-in load control device 110, such that the load control device 110 adjusts an intensity of the lighting load 122 in accordance with the speed at which the rotating portion 134 is rotated.

The remote control device 130 may be configured to recognize predetermined rotational movements of the rotating portion 134 by a user (e.g., user "gestures"). Such user gestures may be associated with the transmission of particular wireless communication signals (e.g., command signals) by the remote control device 130. Such user gestures may include, for example, turning the rotating portion 134 past a threshold rotational distance, turning the rotating portion 134 a predetermined rotational distance within a predetermined amount of time, turning the rotating portion 134 in alternating rotational directions in rapid succession (e.g., "wiggling" the rotating portion 134), and so on. The remote control device 130 may be configured to feedback (e.g., audible or haptic feedback) in response to actuations of the rotating portion 134 (e.g., in response to a user gesture). An example of a remote control device that is configured to provide audible feedback is described in greater detail in commonly-assigned U.S. Pat. No. 8,212,486, issued Jul. 3, 2012, entitled "Smart Load Control Device Having A Rotary Actuator," the entire disclosure of which is incorporated herein by reference.

The remote control device 130 may be configured to transmit one or more control signals based on the recognition of predetermined (e.g., factory preset) gesture-based commands. The remote control device 130 may be configured to be re-programmable, such that a user may customize what control signals are transmitted by the remote control device 130 in response to recognition of one or more predetermined gestures. The remote control device 130 may be configured to facilitate the programming of custom gestures by a user. For example, the remote control device 130 may be configured to learn, and subsequently recognize, a custom user gesture, and to allow a user to associate one or more custom gestures with control signals transmitted by the remote control device 130.

In accordance with an example configuration for the load control system 100, the remote control device 130 may transmit successive wireless communication signals as the rotating portion 134 is rotated, wherein the wireless communication signals cause the plug-in load control device 110 to gradually lower the intensity of the lighting load 122, until a predetermined, threshold rotational distance that is associated with a low-end intensity is met or exceeded. If the remote control device 130 detects continued rotational movement of the rotating portion 134, such that the rotational distance extends beyond the threshold distance (e.g., but within a second threshold distance), the remote control device 130 may transmit one or more wireless communication signals that cause the plug-in load control device 110 to remove power from the lighting load 122.

If the remote control device 130 detects continued rotational movement of the rotating portion 134, such that the rotational distance extends beyond the second threshold distance, the remote control device 130 may transmit one or more wireless communication signals that comprise commands that are directed to one or more electrical loads (e.g., a plurality of electrical loads) that are electrically connected to one or more additional load control devices that are associated with the load control system 100. For example, the remote control device 130 may transmit one or more change of state control signals (e.g., "all off") that may be received by the one or more additional load control devices. In response to receiving the all off control signals, the one or more additional load control devices may remove power from the corresponding plurality of electrical loads. This may allow a plurality of electrical loads associated with the load control system 100 to remain in sync with each other. It should be appreciated that the remote control device 130 is not limited to the above-described example configuration.

The remote control device 130 may be configured to transmit one or more control signals based on the recognition of predetermined (e.g., factory preset) gesture-based commands that are associated with the control of one or more color changing lighting loads (e.g., LED-based bulbs). For example, the load control system 100 may include one or more color changing lighting loads that are associated with, and controllable by, the remote control device 130. The remote control device 130 may be configured to transmit control signals to the one or more color changing lighting loads, based on the recognition of one or more predetermined rotational movements (e.g., gestures).

To illustrate, the remote control device 130 may be configured to recognize that the rotating portion 134 is continuously turned (e.g., at a substantially uniform speed). Based on recognition of this gesture, the remote control device 130 may transmit successive wireless communication signals as the rotating portion 134 is rotated, wherein the wireless communication signals cause the one or more color changing lighting load to gradually cycle through a range of colors (e.g., color to color). When rotation of the rotating portion 134 is interrupted, the remote control device may cease transmitting control signals, for example pausing on a selected color. The remote control device 130 may then wait for rotational movement of the rotating portion 134 to resume (e.g., for a predetermined amount of time). If rotational movement of the rotating portion 134 resumes, the remote control device 130 may transmit successive wireless communication signals as the rotating portion 134 is rotated, wherein the wireless communication signals cause the one or more color changing lighting loads to adjust the intensity of the selected color.

The remote control device 130 is not limited to transmitting wireless communication signals responsive to rotational movement of the rotating portion 134. For example, the rotating portion 134 may be configured to be resiliently biasable toward the base portion 132 (e.g., along an axial direction that is parallel to an axis of rotation of the rotating portion 134). The remote control device 130 may be configured to transmit wireless communication signals responsive to detecting the application of a force to the rotating portion 134, along the axial direction, that causes the rotating portion 134 to move inward toward the base portion 132. Such wireless communication signals may comprise commands for execution by the load control device 110.

For example, the remote control device 130 may be configured to, upon detecting movement applied to the rotating portion 134 along the axial direction (e.g., presses of the rotating portion 134), transmit signals to the load control device 110 that cause the load control device 110 to turn the lighting load 122 on or off (e.g., by applying power to, or removing power from, the lighting load 122). The remote control device 130 may include one or more buttons (not shown), for example supported in the rotating portion 134. Actuation of the one or more buttons may cause the remote control device 130 to transmit wireless communication signals that, for example, comprise commands for execution by the plug-in load control device 110. For example, the remote control device 130 may include two buttons, such as an "on" button and an "off" button, located on a front surface of the rotating portion 134. In such a configuration, actuating the on button may cause the remote control device 130 to transmit one or more control signals that may cause the plug-in load control device 110 to turn on the lighting load 122, and actuating the off button may cause the remote control device 130 to transmit one or more control signals that may cause the plug-in load control device 110 to turn off the lighting load 122.

The remote control device 130 may include an actuator, wherein actuating (e.g., pressing) the actuator causes the remote control device 130 to initiate a configuration procedure, during which the remote control device 130 may be associated with another device of the load control system 100, such as the plug-in load control device 110. For example, the remote control device 130 may be configured to initiate the configuration procedure upon detecting movement applied to the rotating portion 134 along the axial direction (e.g., pressing in and holding the rotating portion 134) for a predetermined amount of time (e.g., approximately 10 seconds). Alternatively, the remote control device 130 may include a distinct actuator (e.g., a button), wherein actuating (e.g., pressing and holding) the button for a predetermined amount of time (e.g., approximately 10 seconds) causes the remote control device 130 to initiate the configuration procedure.

In an example configuration procedure for the load control system 100, the remote control device 130 may be associated with the plug-in load control device 110 by actuating the actuator 114 on the plug-in load control device 110 (e.g., pressing and holding) and then actuating an actuator on the remote control device 130 (e.g., pressing and holding the rotating portion 134 or pressing an holding an actuator button) for a predetermined amount of time (e.g., approximately 10 seconds). Examples of configuration procedures for associating a remote control device with a load control device are described in greater detail in commonly-assigned U.S. Patent Application Publication No. 2008/0111491, published May 15, 2008, entitled "Radio-Frequency Lighting Control System," the entire disclosure of which is incorporated herein by reference.

Wireless communication signals transmitted by the remote control device 130, for example directed to the plug-in load control device 110, may include a command and identifying information, such as a unique identifier (e.g., a serial number) associated with the remote control device 130. After being associated with the remote control device 130, the plug-in load control device 110 may be responsive to wireless communication signals that contain the unique identifier of the remote control device 130.

The operation of the remote control device 130 may be programmed by an external device (e.g., a smart phone). For example, the remote control device 130 may comprise a programming port, such as a universal serial bus (USB) port, for connecting the external device to the remote control device 130 to allow the external device to modify the operation of the remote control device. In addition, the remote control device 130 may be programmed wirelessly by the external device, for instance via RF signals and/or optical signals. Examples of wireless programming procedures are described in greater detail in commonly-assigned U.S. Patent Application Publication No. 2013/0010018, published Jan. 10, 2013, entitled "Method Of Optically Transmitting Digital Information From A Smart Phone To A Control Device", and U.S. Patent Application Publication No. 2013/0026947, published Jan. 31, 2013, entitled "Method Of Programming A Load Control Device Using A Smart Phone", the entire disclosures of which are incorporated herein by reference.

The remote control device 130 may be part of a larger RF load control system than that depicted in FIG. 1. Examples of RF load control systems are described in commonly-assigned U.S. Pat. No. 5,905,442, issued on May 18, 1999, entitled "Method And Apparatus For Controlling And Determining The Status Of Electrical Devices From Remote Locations," and commonly-assigned U.S. Patent Application Publication No. 2009/0206983, published Aug. 20, 2009, entitled "Communication Protocol For A Radio Frequency Load Control System," the entire disclosures of which are incorporated herein by reference.

The load control system 100 depicted in FIG. 1 may provide a simple retrofit solution for an existing switched control system. The load control system 100 may provide energy savings and/or advanced control features, for example without requiring any electrical re-wiring and/or without requiring the replacement of any existing mechanical switches. To install and use the load control system 100 of FIG. 1, a consumer may install a plug-in load control device 110, plug in an electrical load (e.g., the lamp 120) into the load control device 110, switch the toggle actuator 108 of a mechanical switch 102 to the on position, install (e.g., mount) the remote control device 130 onto the toggle actuator 108, and associate the remote control device 130 and the plug-in load control device 110 with each other, for example as described above.

It should be appreciated that the load control system 100 need not include the plug-in load control device 110 to enable a controllable lighting load. For example, in lieu of the load control device 110 and the lighting load 122, the load control system 100 may alternatively include a controllable light source that is electrically connected to (e.g., screwed into the socket of) the lamp 120, and that may be associated with, and controlled by, the remote control device 130. Examples of controllable light sources are described in greater detail in commonly-assigned U.S. Patent Application Publication No. 2014/0117859, published May 1, 2014, entitled "Controllable Light Source," and commonly-assigned U.S. Patent Application Publication No. 2014/0117871, published May 1, 2014, entitled "Battery-Powered Retrofit Remote Control Device," the entire disclosures of which are incorporated herein by reference. It should further be appreciated that the remote control device 130 is not limited to being associated with, and controlling, a single load control device. For example, the remote control device 130 may be configured to control multiple controllable load control devices (e.g., substantially in unison).

Figure 3:
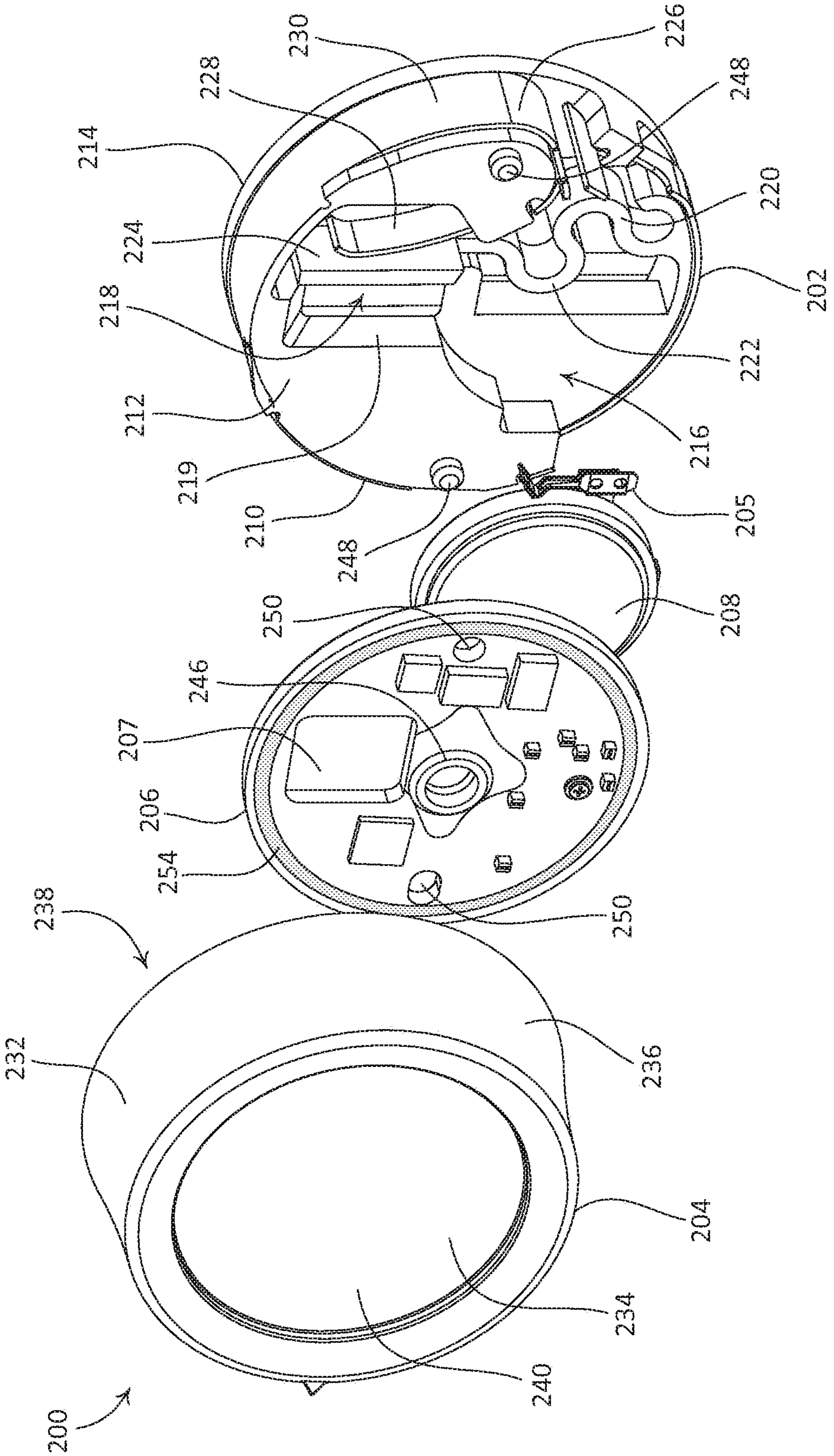
FIG. 3 is an exploded view of another example remote control device.
Figure 5:
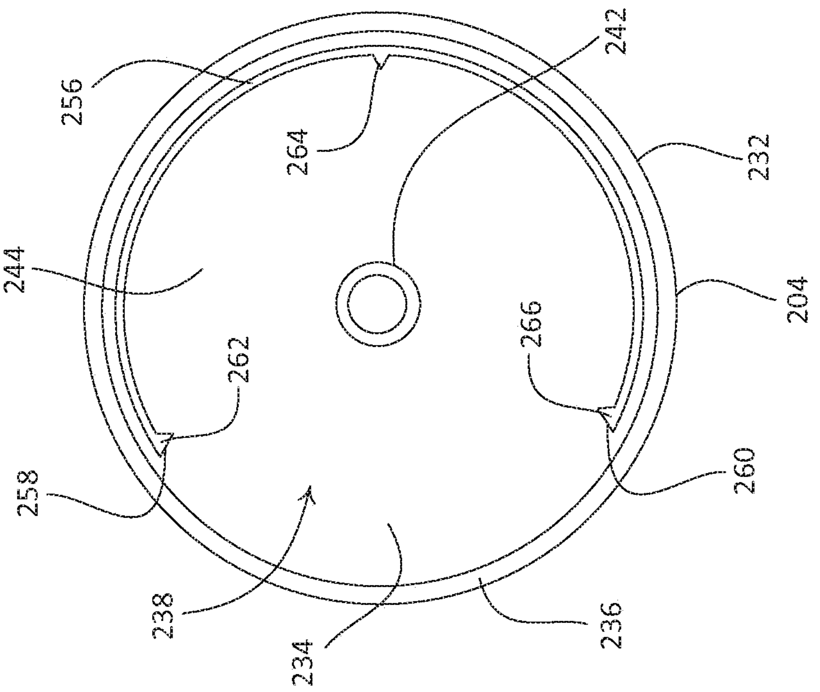
FIG. 5 is a rear view of a rotating portion component of the example remote control device depicted in FIG. 3.
Figure 4:
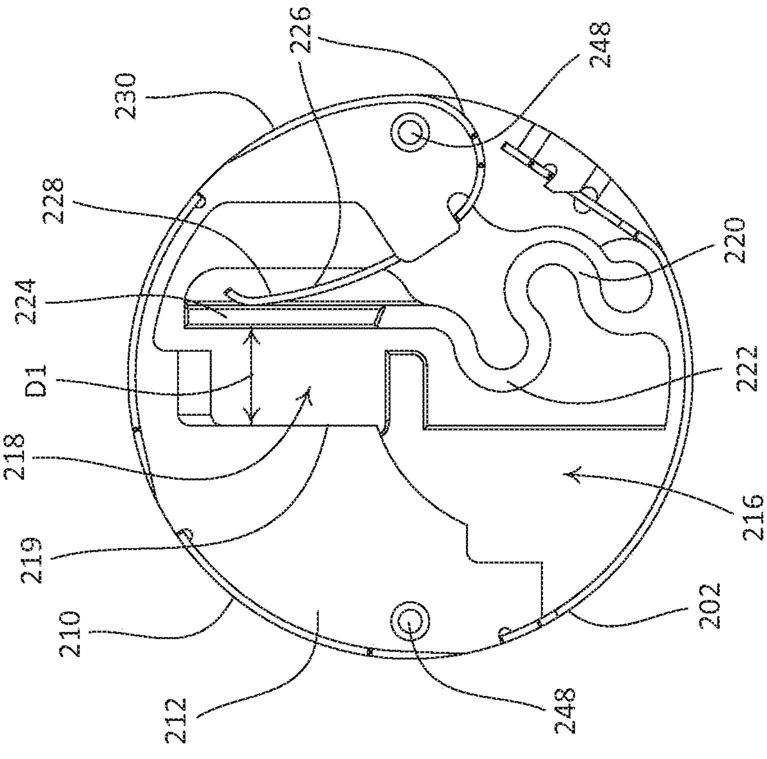
FIG. 4 is a front view of a base portion component of the example remote control device depicted in FIG. 3.

FIGS. 3-5 depict components of an example remote control device 200 that may be deployed as, for example, the remote control device 130 of the load control system 100 depicted in FIG. 1. As shown, the remote control device 200 includes a base portion 202 and a rotating portion 204 that is configured to be rotatable in opposed directions about the base portion 202, for example in the clockwise or counter-clockwise directions. The base portion 202 and the rotating portion 204 may be made of any suitable material, such as plastic. The remote control device 200 further includes a printed circuit board (PCB) 206 that carries one or more electronic components of the remote control device 200. As shown, the PCB 206 may be circularly-shaped and may have an outer diameter of, for example, approximately 1.5 inches. However, it should be appreciated that the diameter of the PCB 206 may be larger or smaller than 1.5 inches, for example in accordance with alternative configurations of the remote control device 200. The remote control device 200 further includes a battery 208 that is configured to provide power to one or more electronic components of the remote control device 200.

The base portion 202 includes a cylindrically shaped body 210. The body 210 of the base portion 202 defines a front side 212 and an opposed rear side 214 that is spaced from the front side 212. The body 210 defines a recess 216 that extends into the front side 212, the recess 216 configured to receive at least a portion of the battery 208. The base portion 202 may be configured to removably retain the battery 208 in the recess 216.

The base portion 202 may be configured to be removably mounted over the toggle actuator of a mechanical switch, such as the toggle actuator 108 of the switch 102 as depicted in FIGS. 1, 2A, and 2B. As shown, the body 210 defines an opening 218 that extends into the rear side 212, and through the body 210. The opening 218 is sized to receive a corresponding portion of a toggle actuator of a mechanical switch (e.g., the toggle actuator 108 of the switch 102), for example when the base portion 202 is mounted over the toggle actuator. As shown, the opening 218 is located adjacent to the recess 216, such that the toggle actuator will not interfere with the battery 208 when the base portion 202 is mounted over the toggle actuator 108. The PCB 206 may define an opening 207 that is configured to receive a portion of the toggle actuator 108 when the base portion 202 is mounted over the toggle actuator 108.

The base portion 202 may be configured to engage with, and retain, the toggle actuator 108 within the opening 218, and thereby retain the remote control device 200 in a mounted position relative to the toggle actuator 108. This may prevent the remote control device 200 from being unintentionally dislodged from the mounted position. As shown, the body 210 defines a deflectable arm 220 that extends into the opening 218. The illustrated arm 220 defines a curved portion 222 that extends from a fixed end at a lower end of the body 210, to a free end. The free end defines a paddle 224 that is configured to engage with a portion of the toggle actuator 108. The arm 220 may define a relaxed (e.g., undeflected) position, wherein the paddle 224 is spaced from an opposed, interior surface 219 of the opening 218 by a distance D1 that is shorter than a width of a corresponding portion of the toggle actuator 108. When the base portion 202 is mounted over the toggle actuator 108, the toggle actuator 108 may make contact with interior surface 219 and the paddle 224, such that the paddle 224 rides onto and along a corresponding side surface of the toggle actuator 108.

The illustrated base portion 202 further includes a resilient strap 226 that is attached to the body 210. As shown, the strap 226 defines an interior portion 228 that is disposed in an interior of the body 210, and an exterior portion 230 that wraps around, and abuts, an outer perimeter of the body 210. The interior portion 228 of the strap 226 is configured to extend into the opening 218 and to abut a portion of the paddle 224 of the arm 220. The strap 226 may abut the paddle 224 with little to no force when the arm 220 is in the relaxed position in the opening 218. When the base portion 202 is mounted over the toggle actuator 108, such that the toggle actuator 108 makes contact with interior surface 219 of the opening 218 and the paddle 224, the strap 226 biases the paddle 224 against the toggle actuator 108, creating friction forces between the interior surface 219, the toggle actuator 108, and the paddle 224 that clamp the toggle actuator 108 in position in the opening 218. The friction forces operate to resist movement of the toggle actuator 108 relative to the base portion 202, such that the arm 220, the strap 226, and the body 210 of the base portion 202 (e.g., the interior surface 219) cooperate to retain the toggle actuator 108 in a mounted position in the opening 218. The strap 226 may be made of any suitable material, such as metal (e.g., spring steel). The strap 226 (e.g., the exterior portion 230) may be configured to operate as an antenna of the remote control device 200.

The base portion 202 may be configured to maintain the toggle actuator 108 in the on position when the remote control device 200 is mounted over the toggle actuator 108. In this regard, the base portion 202 may be configured such that a user is not able to inadvertently switch the toggle actuator 108 to the off position when the remote control device 200 is attached to the switch 102. For example, the rear side 214 of the body 210 may be flat, such that the rear side 214 abuts a faceplate of the switch 102 (e.g., faceplate 103 in FIGS. 2A-2B) when the remote control device 200 is in a mounted position relative to the toggle actuator 108. The rear side 214 of the body 210 may be semi-permanently attached to the faceplate 103, for example using an adhesive (e.g., double-sided tape) applied or affixed to the rear side 214 of the body 210. It should be appreciated that the base portion 202 may be otherwise attached to, or integrated with, the faceplate 103 (e.g., using one or more fasteners, such as screws). Examples of attaching remote control devices to, and integrating remote control devices with, faceplates are described in greater detail in commonly-assigned U.S. Patent Application Publication No. 2014/0117859, published May 1, 2014, entitled "Controllable Light Source," and commonly-assigned U.S. Patent Application Publication No. 2014/0117871, published May 1, 2014, entitled "Battery-Powered Retrofit Remote Control Device," the entire disclosures of which are incorporated herein by reference.

As shown, the rotating portion 204 includes a body 232 that defines a disc-shaped front wall 234 and an annular side wall 236 that extends rearward from the front wall 234, around an entirety of an outer perimeter of the front wall 234. The front wall 234 and the side wall 236 define a cavity 238 that is configured to receive the PCB 206.

The front wall 234 defines a front surface 240. The front wall 234 may be made of a translucent material, such that a light associated with a toggle actuator of the remote control device 200 may shine through the front wall 234. The remote control device 200 may include an internal night light circuit, for example, as described in greater detail in commonly-assigned U.S. Patent Application Publication No. 2012/0286940, published Nov. 15, 2012, entitled "Control Device Having a Night Light," the entire disclosure of which is incorporated herein by reference.

The rotating portion 204 may be supported by the base portion 202 so as to be rotatable in opposed directions about the base portion 202, for example in the clockwise or counter-clockwise directions. For example, as shown, the rotating portion 204 may be rotatably attached to the PCB 206, such that the rotating portion 204 may rotate about the PCB 206 (e.g., in the clockwise or counterclockwise directions); and the PCB 206 may be configured to be attached to the base portion 202. In this regard, the rotating portion 204 may be supported by the base portion 202 (e.g., indirectly via the PCB 206) so as to be rotatable in opposed directions about the base portion 202. As shown, the rotating portion 204 includes a post 242 that extends rearward from an inner surface 244 of the front wall 234. The post 242 may be configured to be received in a collar 246 that is attached to the PCB 206, such that the rotating portion 204 and the PCB 206 are attached to one another. The post 242 defines a free end that may be spaced from the front wall 234 such that the PCB 206 is encircled by the side wall 236 when the post 242 is disposed in the collar 246. The post 242 may be fixed in position relative to the front wall 234. For example, the post 242 may be rotatably attached to the collar 246 (e.g., such that the post 242 and the rotating portion 204 are monolithic). Alternatively, the post 242 may be rotatably attached to the front wall 234 (e.g., via a rotating coupling) and may be attached to the collar 246 in a fixed position.

The PCB 206 may be configured such that the battery 208 may be removably attached to a rear side of the PCB 206. For example, the PCB 206 may include one or more electrical contacts 205 that are attached to the rear side of the PCB 206. The electrical contacts 205 may be configured to retain the battery 208 in removable attachment to the PCB 206, and to place the battery 208 in electrical communication with one or more electrical components of the remote control device 200.

The rotating portion 204, the PCB 206, and the battery 208, when attached to one another, may comprise a detachable assembly that may be configured to be removably attached to the base portion 202, for example such that the detachable assembly may be detached from the base portion 202 to allow changing of the battery 208. In an example configuration, the base portion 202 may include a magnetic element (not shown) that is disposed in a surface of the base portion 202 (e.g., in the recess 216), such that the detachable assembly may be attached to the base portion 202 by magnetically attaching the battery 208 to the base portion 202. In this regard, the rotating portion 204 may be configured to be removably attached to the base portion 202 via a magnetic connection between the base portion 202 and the battery 208. Stated differently, the rotating portion 204 is magnetically attachable to the base portion. It should be appreciated the remote control device 200 is not limited to magnetic attachment of the detachable assembly to the base portion 202, and that one or more of the base portion 202, the rotating portion 204, or the PCB 206 may be alternatively configured to facilitate attachment of the detachable assembly to the base portion 202.

The remote control device 200 may be configured to align the detachable assembly relative to the base portion 202 during attachment of the detachable assembly to the base portion 202. For example, as shown, the base portion 202 defines projections 248 that extend outwardly from the front side 212 of the base portion 202. The PCB 206 defines apertures 250 that are configured to receive the projections 248 when the detachable assembly is properly aligned relative to the base portion 202 (e.g., such that the battery 208 is properly received in the recess 216).

It should be appreciated that the remote control device 200 is not limited to the illustrated configuration of the base portion 202 rotatably supporting the rotating portion 204. For example, the rotating portion 204 may alternatively include a fixed portion (not shown) that corresponds to the front wall 234. In accordance with the alternative configuration, the side wall 236 may be supported by the fixed portion so as to be rotatable in opposed directions about the fixed portion, for example in the clockwise or counter-clockwise directions. In this regard, the side wall 236 may comprise the rotating portion of the remote control device 200.

Further in accordance with the alternative configuration, the fixed portion may be configured to operate as an actuator of the remote control device 200. For example, the remote control device 200 may be configured to initiate a configuration procedure upon detecting movement applied to the fixed portion along the axial direction (e.g., pressing in and holding the fixed portion) for a predetermined amount of time (e.g., approximately 10 seconds). Alternatively, the remote control device 200 may include a distinct actuator (e.g., a button) that is located on an outer surface of the fixed portion, wherein actuating (e.g., pressing and holding) the button for a predetermined amount of time (e.g., approximately 10 seconds) causes the remote control device 130 to initiate the configuration procedure. The fixed portion may be configured to include more than one button, such as a plurality of buttons. The plurality of buttons may cause the remote control device to transmit respective command signals. Such command signals may correspond to one or more of, for example, initiating the configuration procedure of the remote control device 200, toggling a lighting load associated with the remote control device (e.g., via a load control device) on and off, changing an intensity of the lighting load, selecting a preset lighting scene, and so on. For example, the fixed portion may be configured to include two buttons, such as an “on” button and an “off” button. Actuating the on button may cause the remote control device 200 to transmit one or more control signals that may cause an associated load control device (e.g., the plug-in load control device 110) to turn on a lighting load (e.g., the lighting load 122), and actuating the off button may cause the remote control device 200 to transmit one or more control signals that may cause the load control device to turn off the lighting load. The fixed portion may include a display screen that may be configured to display information related to the remote control device 200 and/or other components of a load control system with which the remote control device 200 is associated.

The remote control device 200 may be configured to transmit one or more wireless communication signals to one or more devices of a load control system with which the remote control device 200 is associated. For example, the remote control device 200 may be configured to transmit wireless communication signals as described herein with reference to the remote control device 130 of the load control system 100. To illustrate, the remote control device 200 may be implemented as the remote control device 130 in the load control system 100, such that the remote control device 200 may transmit RF signals 140 to one or more devices associated with the load control system 100, such as the plug-in load control device 110, and may thereby control the lighting load 122. The remote control device 200 may be configured (e.g., setup, programmed, etc.), and may operate (e.g., via rotational movements, axial forces, etc. applied to the rotating portion 204) as described herein with reference to the remote control device 130 of the load control system 100.

As shown, the PCB 206 includes a printed circuit pattern that includes a plurality of electrically conductive circuit board pads 252, each circuit board pad 252 having an exposed electrically conductive surface. The circuit board pads 252 are arranged in an annular array 254 proximate to an outer perimeter of the PCB 206. The array 254 of circuit board pads 252 may be configured to operate as both a rotary encoder circuit (e.g., an incremental rotary encoder circuit) and an antenna of the remote control device 200, for example as described herein. The remote control device 200 may include a conductive interconnect member 256 that is configured to persistently make mechanical and electrical contact with at least one circuit board pad 252 of the array 254.

As shown, the interconnect member 256 extends from a first end 258 to an opposed second end 260. The interconnect member 256 defines a semicircular shape that closely follows an inner perimeter of the side wall 236 of the rotating portion 204. The interconnect member 256 may be disposed into the cavity 238, and fixedly attached to the inner surface of the front wall 234 (e.g., as shown in FIG. 5) and/or to another surface of the rotating portion 204. The illustrated interconnect member 256 defines a first contact prong 262 that is located at the first end 258, a second contact prong 264 that is located between the first and second ends 258, 260 (e.g., midway between the first and second ends 258, 260), and a third contact prong 266 that is located at the second end 260. As shown, the interconnect member 256 is configured such that at least one of the first, second, or third contact prongs 262, 264, 266 makes contact with one of the circuit board pads 252, regardless of the position of the interconnect member 256 relative to the array 254.

Figure 6:
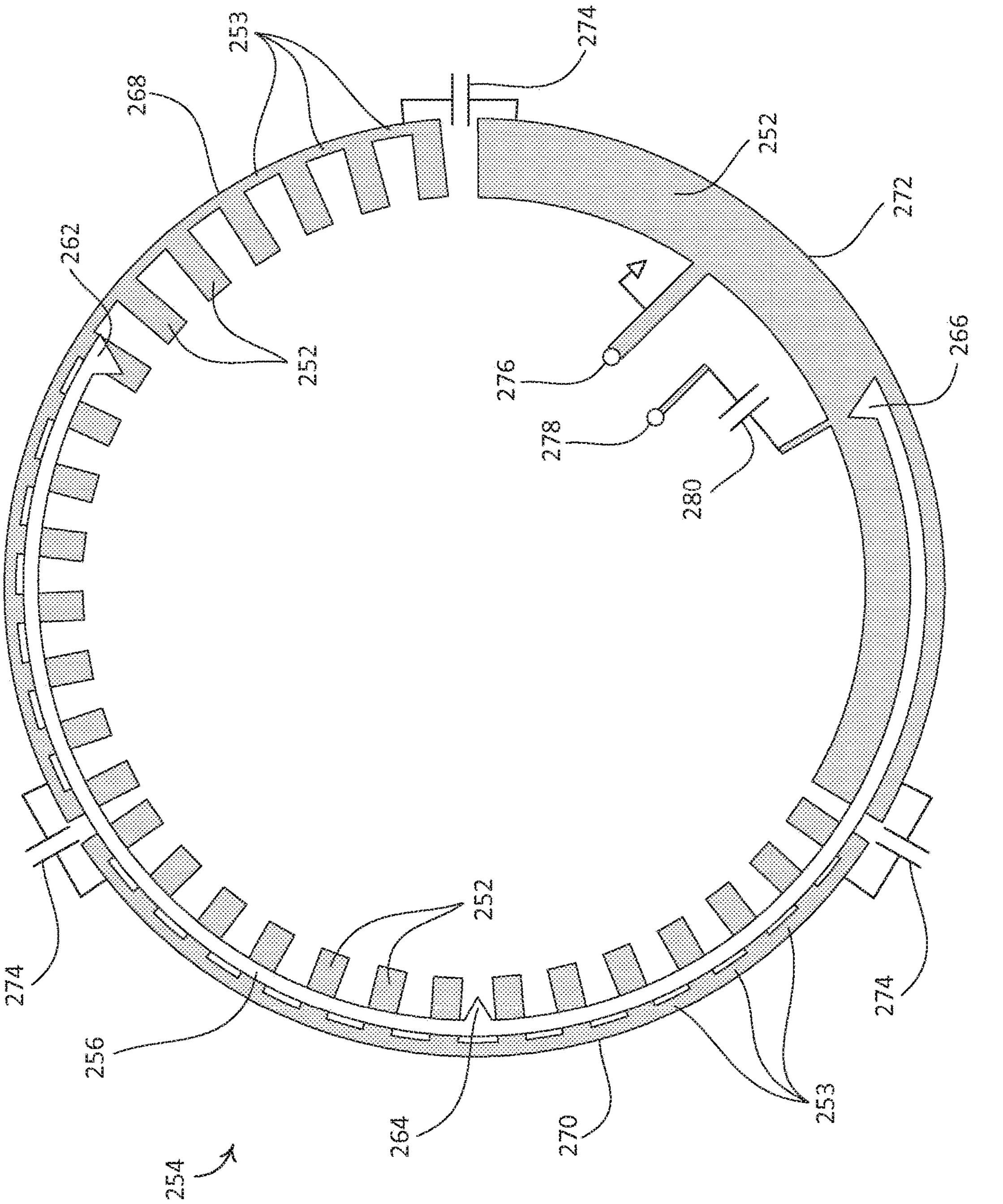
FIG. 6 is a diagram of an example rotary encoding circuit and antenna.

FIG. 6 depicts a view of the array 254 of circuit board pads 252. As shown, the array 254 may function as both an incremental rotary encoder circuit of the remote control device 200, and as an antenna of the remote control device 200. As shown, the array 254 defines a plurality of discrete input zones that include a first input zone 268, a second input zone 270, and a third input zone 272. The first and second input zones 268, 270 include respective pluralities of circuit board pads 252 that are interconnected with respective circuit board traces 253. The third input zone 272 includes a single circuit board pad 252.

The array 254 may operate as a rotary encoder circuit by detecting a rotational movement applied to the rotating portion 204 of the remote control device 200 (e.g., a rotational force applied to the side wall 236). For example, when a rotational movement is applied to the rotating portion 204, the interconnect member 256 rotates along with the rotating portion 204, and thus rotates relative to the array 254, such that the first, second, and third contact prongs 262, 264, 266 rotate around the array 254, moving from one circuit board pad 252 another (e.g., in the clockwise or counterclockwise directions). Because the diameter of the annular array 254 of circuit board pads 252 is larger than the diameter of typical mechanical quadrature encoders, the rotary encoder circuit comprising the array 254 may provide higher resolution than typical mechanical quadrature encoders.

The first, second, and third contact prongs 262, 264, 266 of the interconnect member 256 may be spaced apart from each other such that the interconnect member 256 persistently makes contact with at least one of the plurality of input zones. For example, as depicted in FIG. 6, if the first contact prong 262 is making contact with a circuit board pad 252 in the first input zone 268, the second contact prong 264 is between circuit board pads 252 in the second input zone 270, and the third contact prong 266 is making electrical contact in the third input zone 272. As a rotational movement (e.g., a slight turn) is applied to the rotating portion 204, the first contact prong 262 moves between circuit board pads 252 in the first input zone 268, the second contact prong 264 makes contact with a circuit board pad 252 in the second input zone 270, and the third contact prong 266 continues making electrical contact in the third input zone 272.

The rotary encoder circuit may be configured to generate one or more control signals, for example in response to forces applied to the rotating portion 204. The control signals may be provided to a control circuit of remote control device 200 (e.g., as input signals). For example, the rotary encoder circuit may be configured to generate a first encoder control signal VE1 and a second encoder control signal VE2 in response to the application of a rotational movement to the rotating portion 204 of the remote control device 200. The first and second encoder control signals VE1, VE2 may, in combination, be representative of an angular velocity ω at which the rotating portion 204 is rotated and an angular direction (e.g., clockwise or counterclockwise) in which the rotating portion 204 is rotated. The rotary encoder circuit may be configured to generate a third control signal, such as a toggle control signal $V_{TOG}$, in response to detecting the application of a force to the rotating portion 204, along the axial direction, that causes the rotating portion 204 to move inward toward the base portion 202.

The rotary encoder circuit may be configured to operate as an antenna of the remote control device 200. For example, the first, second, and third input zones 268, 270, 272 may be electrically interconnected, for example with capacitors 274, such that the respective circuit board pads 252 and corresponding circuit board traces 253 of the array 254, along with the capacitors 274, define a loop antenna of the remote control device 200. The circuit board traces 253 of the array 254 may be characterized by an inductance, which, along with the capacitance of the capacitors 274, may define a resonant frequency of the antenna. The capacitors may be, for example, 4.7 pF capacitors, or may be differently sized capacitors. The values of the capacitors may depend upon the diameter of the annular array 254 of circuit board pads 252 and/or the desired communication frequency of the RF signals. As shown, the rotary encoder circuit may define respective first and second antenna feeds 276, 278, that may provide antenna signals to and/or receive antenna signals from, a control circuit of the remote control device 200. The second antenna feed 278 may include a capacitor 280, for example, a 3.3 pF capacitor. The capacitor 280 may not be required and/or other feed circuit may be coupled between the rotary encoder circuit and the control circuit of the remote control device 200. The interconnect member 256 may comprise a first impedance between the first contact prong 262 and the second contact prong 264, and a second impedance between the second contact prong 264 and the third contact prong 266. The first and second impedances may comprise, for example, resistors having resistances of 10 kΩ, and may operate to prevent the interconnect member 256 from affecting the tuning (e.g., the resonant frequency) of the antenna. The first and second impedances may also comprise inductors or ferrite beads.

While the array 254 shown in FIG. 6 may function as an incremental rotary encoder circuit, the remote control device 200 could include other types of rotary encoder circuits that also function as the antenna for the remote control device 200. For example, the rotary encoder circuit could comprise an absolute encoder circuit or a resistive encoder circuit (e.g., a potentiometer circuit) having conductive pads and/or traces (e.g., polymer thick film (PTF) material) that may be used as the antenna for the remote control device 200.

Figure 7:
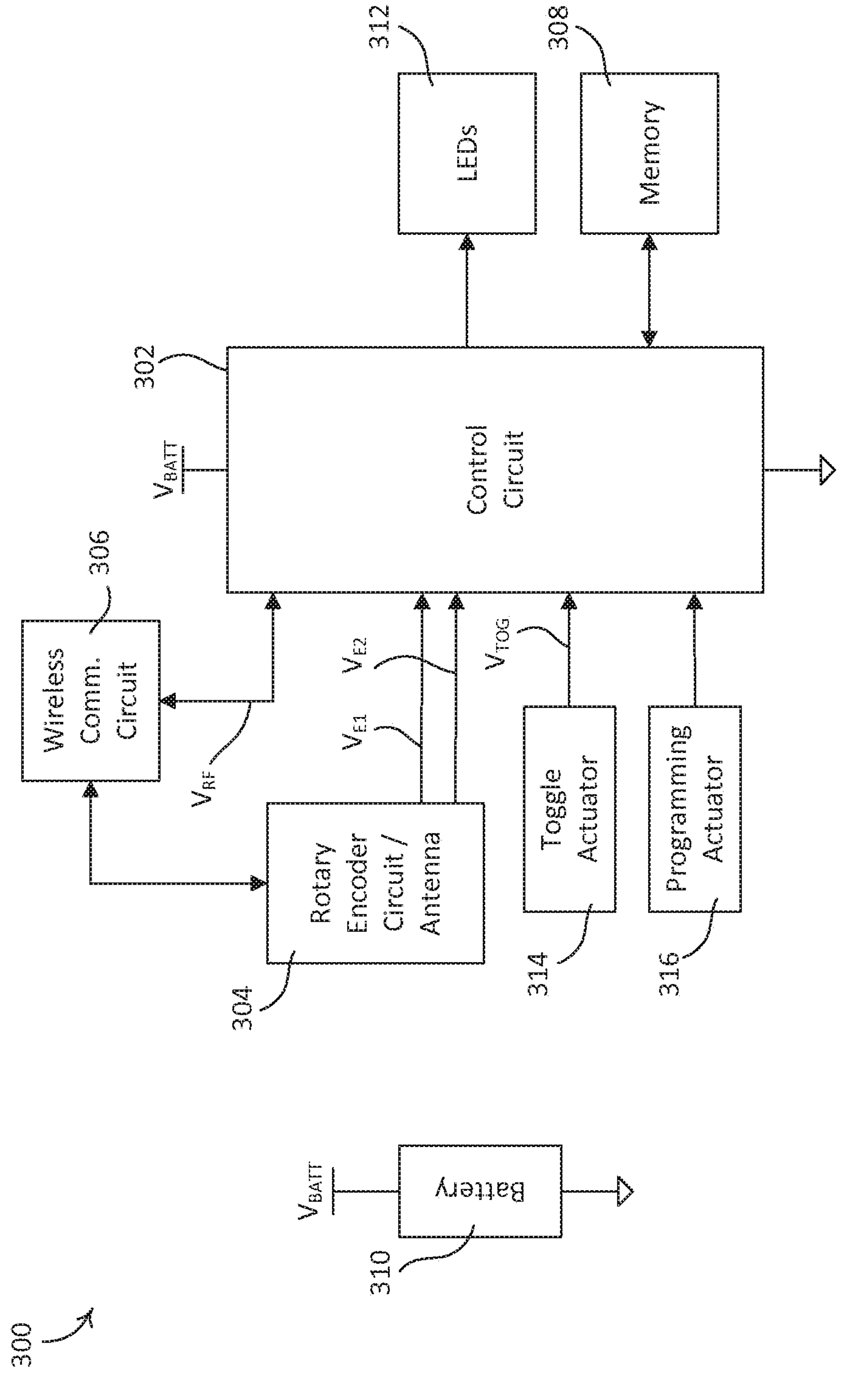
FIG. 7 is a simplified block diagram of another example remote control device.

FIG. 7 is a simplified block diagram of an example remote control device 300 that may be implemented as, for example, the remote control device 130 and/or the remote control device 200. As shown, the remote control device 300 includes a control circuit 302, a rotary encoder circuit 304 that is configured to operate as an antenna, a wireless communication circuit 306, a memory 308, a battery 310, one or more visual indicators (e.g., LEDs 312), a toggle actuator 314, and a programming actuator 316.

The control circuit 302 may include one or more of a processor (e.g., a microprocessor), a microcontroller, a programmable logic device (PLD), a field programmable gate array (FPGA), an application specific integrated circuit (ASIC), or any suitable processing device. The control circuit 302 may be configured to enter a sleep state when a predetermined amount of time elapses after the control circuit 302 receives a most recent control signal from the rotary encoder circuit 304.

The rotary encoder circuit 304 may be configured to operate as both a rotary encoder circuit and as an antenna, for example in accordance with the array 254. The rotary encoder circuit 304 may be coupled to (e.g., in electrical communication with) the wireless communication circuit 306 (e.g., via the first and second antenna feeds 276, 278) for transmitting and receiving wireless signals (e.g., RF signals). The rotary encoder circuit 304 may be operatively coupled to a rotating component (not shown) of the remote control device. The rotating component may be, for example, the rotating portion 134 of the remote control device 130 or the rotating portion 204 of the remote control device 200. As shown, the rotary encoder circuit 304 is communicatively coupled to (e.g., in electrical communication with) the control circuit 302. The rotary encoder circuit 304 may be configured to detect the application of a rotational movement to the rotating component, and to provide one or more corresponding input signals (e.g., first and second encoder control signals VE1, VE2) to the control circuit 302.

The toggle actuator 314 may be a mechanical tactile switch that may be actuated by applying a force to a rotating portion of the remote control device 300 (e.g., the rotating portion 134 of the remote control device 130 or the rotating portion 204 of the remote control device 200). In response to detecting one or more forces applied to the rotating portion (e.g., along the axial direction) the toggle actuator 314 may provide an input signal (e.g., a toggle control signal $V_{TOG}$) to the control circuit 302.

The control circuit 302 may receive the one or more input signals (e.g., the first and second encoder control signal $V_{E1}$, $V_{E2}$) from the rotary encoder circuit 304, for example responsive to the application of a rotational movement to the rotating component, and/or may receive one or more input signals (e.g., the toggle control signal $V_{TOG}$) from the toggle actuator 314, for example responsive to actuation of the rotating component in the axial direction. The control circuit 302 may be configured to translate input signals from the rotary encoder circuit 304 and/or the toggle actuator 314 into one or more drive signals for the wireless communication circuit 306 (e.g., an RF control signal $V_{RF}$). The control circuit 302 may cause the wireless communication circuit 306 to transmit one or more wireless communication signals via the antenna of the rotary encoder circuit 304, for instance to a load control device that is associated with the remote control device 300 (e.g., the plug-in load control device 110). The control circuit 302 may receive one or more wireless communication signals via the wireless communication circuit 306 and the antenna of the rotary encoder circuit 304.

The control circuit 302 may be configured to awake from the sleep state upon the application of a rotational movement to the rotating component. For example, the remote control device 300 may include an interrupt pin (not shown) that may be operatively coupled to the rotating component. When the rotating component is rotated, the interrupt pin may short, thereby waking up the control circuit 302. Upon awakening from the sleep state, the control circuit 302 may start polling, for example for control signals from the rotary encoder circuit 304. Configuring the remote control device 300 such that the control circuit 302 may enter a sleep state, and be mechanically awakened from the sleep state (e.g., via the interrupt pin) may conserve the life of the battery 310, for example in comparison to implementing a control circuit 302 that is not configured to enter a sleep state.

The wireless communication circuit 306 may be, for example an RF transmitter coupled to the antenna of the rotary encoder circuit 304, for transmitting wireless communication signals, such as the RF signals 140, in response to the application of rotational movements of the rotating component coupled to the rotary encoder circuit 304. As shown, the wireless communication circuit 306 is communicatively coupled to (e.g., in electrical communication with) the control circuit 302 (e.g., via the RF control signal $V_{RF}$). The wireless communication circuit 306 may alternatively include one or more of an RF receiver for receiving RF signals, an RF transceiver for transmitting and receiving RF signals, or an infrared (IR) receiver for receiving IR signals.

As shown, the memory 308 is communicatively coupled to (e.g., in electrical communication with) the control circuit 302. The control circuit 302 may be configured to use the memory 308 for the storage and/or retrieval of, for example, a unique identifier (e.g., a serial number) of the remote control device 300. The memory 308 may be implemented, for example, as an external integrated circuit (IC), or as an internal circuit of the control circuit 302.

The remote control device 300 includes a battery 310 for producing a battery voltage $V_{BATT}$ that may be used to power one or more of the control circuit 302, the rotary encoder circuit 304, the wireless communication circuit 306, the memory 308, and other low-voltage circuitry of the remote control device 300. The remote control device 300 may include a solar cell (not shown) that is configured to charge the battery 310 and/or another energy storage device, such as a capacitor. The solar cell may be located on a surface of the remote control device 300, for example on an outward facing surface of the rotating component. The battery 310 and/or the capacitor may be charged using other energy harvesting techniques, for instance by harvesting kinetic energy generated by the rotations of the rotating portion 134 and/or actuations of the rotating portion 134 along the axial direction. In addition, the remote control device 300 could include a power input, for example, for charging the battery 310 from an external power source. For example, the remote control device 300 may be temporarily removed from the toggle actuator 108 and mounted in a charging dock for charging the battery 310. Further, the battery 310 may be inductively charged.

The remote control device 300 may include one or more visual indicators, for example one or more LEDs 312. The visual indicators may be configured to provide feedback to a user of the remote control device 300. As shown, the LEDs 312 are operatively coupled to (e.g., in electrical communication with) the control circuit 302. The control circuit 302 may be configured to control the LEDs 312 to provide feedback indicating a status of a lighting load connected to load control device with which the remote control device 300 is associated (e.g., the lighting load 122 electrically connected to the plug-in load control device 111). Status indications may include, for example, whether the lighting load 122 is on or off, a present intensity of the lighting load 122, and so on. In an example implementation, the LEDs 312 may include a red LED, a green LED, and a blue LED (e.g., RGB LEDs) for illuminating a single visual indicator, and the control circuit 302 may illuminate the visual indicator in a specific color, for instance to indicate a controlled color (e.g., color temperature) of the lighting load 122. The control circuit 302 may be configured to illuminate one or more of the LEDs 312 in order to provide an indication that the battery 310 is low on energy, to provide feedback during programming or association of the remote control device 300, and/or to provide a night light.

In response to the application of one or more forces to the rotating component (e.g., rotational movements, presses along the axial direction), the rotary encoder circuit 304 may generate one or more input signals (e.g., the encoder control signals $V_{E1}$, $V_{E2}$) and the toggle actuator 314 may generate an input signal (e.g., the toggle signal $V_{TOG}$), which may be received by the control circuit 302. The control circuit 302 may, responsive to receiving the one or more input signals, cause the wireless communication circuit 306 to transmit one or more control signals, for example RF signals, to a load control device that is associated with the remote control device 300 (e.g., the plug-in load control device 110). The load control device, responsive to receiving the RF signals, may change the state and/or intensity of an electrical load that is electrically connected to the load control device (e.g., the lighting load 122).

The programming actuator 316 may be operatively coupled to (e.g., in electrical communication with) the control circuit 302. The programming actuator 316 may be actuated to associate the remote control device 300 with one or more devices of a load control system with which the remote control device is associated (e.g., the plug-in load control device 110 of the load control system 100).

The remote control device 300 may also include an internal sensing circuit (not shown) that is coupled to the control circuit 302. The sensing circuit may comprise an occupancy sensing circuit configured to detect occupancy and vacancy conditions in the space in which the remote control device 300 is installed. The remote control device 300 may comprise a lens (not shown) located, for example, on a front surface of the rotating portion 134 for directing infrared energy from an occupant to the occupancy sensing circuit. The remote control device 300 may be configured to transmit a digital message (e.g., to the plug-in load control device 110 of the load control system 100) in response to the sensing circuit determining that the space is occupied or vacant. For example, the remote control device 300 may be configured to, in response to determining that the space is occupied, transmit a digital message that causes the plug-in load control device 110 to turn on the lamp 120 and/or may be configured to, in response to determining that the space is vacant, transmit a digital message that causes the plug-in load control device 110 to turn off the lamp 120. In this regard, the plug-in load control device 110 may be operate to turn on the lamp 120 in response to determining that the space is occupied and to turn off the lamp in response to determining that the space is unoccupied (e.g., as with an "occupancy" sensor). In addition, the plug-in load control device 110 may be configured to only turn off the lamp in response to determining that the space is unoccupied, and/or to turn on the lamp in response to determining that the space is occupied (e.g., as with an "vacancy" sensor). Examples of occupancy and vacancy sensors are described in greater detail in commonly assigned U.S. Pat. No. 8,009,042, issued Aug. 30, 2011 Sep. 3, 2008, entitled "Radio Frequency Lighting Control System With Occupancy Sensing," U.S. Pat. No. 8,199,010, issued Jun. 12, 2012, entitled "Method And Apparatus For Configuring A Wireless Sensor," and U.S. Pat. No. 8,228,184, issued Jul. 24, 2012, entitled "Battery Powered Occupancy Sensor," the entire disclosures of which are incorporated herein by reference.

The sensing circuit may also comprise a photosensing circuit (e.g., a daylight sensing circuit) configured to measure a light intensity in the space in which the remote control device 300 is installed. The remote control device 300 may comprise a lens (not shown) located, for example, on front surface of the rotating portion 134 for directing light from outside the remote control device to the photosensing circuit. The remote control device 300 may be configured to transmit a digital message including the measured light intensity (e.g., to the plug-in load control device 110 of the load control system 100). The plug-in load control device 110 may be configured turn the lamp 120 on and off and/or to adjust the intensity of the lamp 120 in response to the measured light intensity. Examples of photosensing circuits are described in greater detail in commonly assigned U.S. Pat. No. 8,410,706, issued Apr. 2, 2013, entitled "Method Of Calibrating A Daylight Sensor," and U.S. Pat. No. 8,451,116, issued May 28, 2013, entitled "Wireless Battery-Powered Daylight Sensor," the entire disclosures of which are incorporated herein by reference.

Figure 8A:
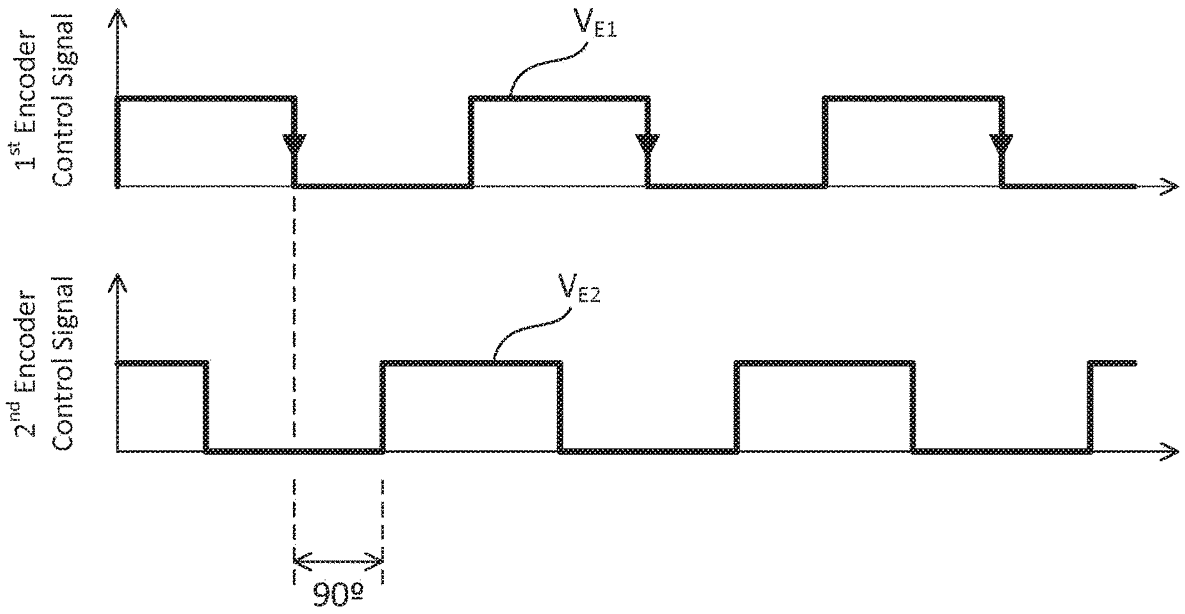
FIG. 8A depicts a first encoder control signal and a second encoder control signal when an example remote control device is actuated along a first direction.
Figure 8B:
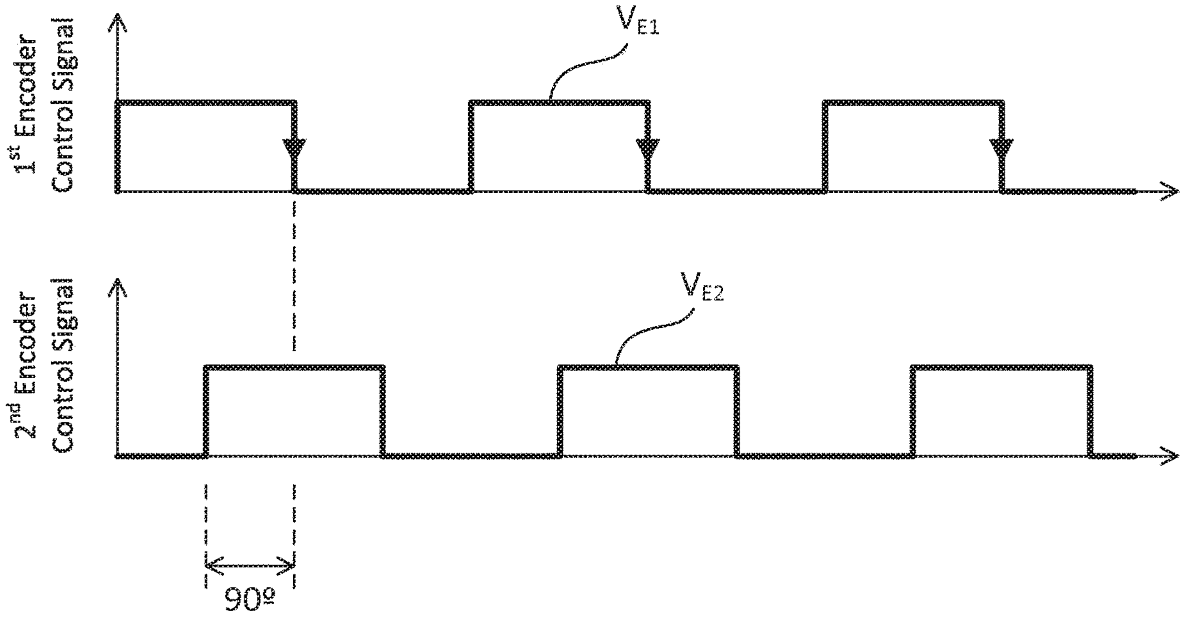
FIG. 8B depicts a first encoder control signal and a second encoder control signal when an example remote control device is actuated along a second direction.

FIG. 8A is a simplified diagram showing example waveforms of the first encoder control signal $V_{E1}$ and the second encoder control signal $V_{E2}$ when the rotating component is being rotated in the clockwise direction. The first encoder control signal $V_{E1}$ lags the second encoder control signal $V_{E2}$ by 90° when the rotating component is rotated in the clockwise direction. FIG. 8B is a simplified diagram showing example waveforms of the first encoder control signal $V_{E1}$ and the second encoder control signal $V_{E2}$ when the rotating component is being rotated in the counter-clockwise direction. The second encoder control signal $V_{E2}$ lags the first encoder control signal $V_{E1}$ by 90° when the rotating component is rotated in the counter-clockwise direction.

The control circuit 302 may be configured to determine whether the second encoder control signal $V_{E2}$ is low (e.g., at approximately circuit common) or high (e.g., at approximately the battery voltage $V_{BATT}$) at the times of the falling edges of the first encoder control signal $V_{E1}$ (e.g., when the first encoder control signal $V_{E1}$ transitions from high to low), in order to determine whether the rotating component is being rotated in the clockwise or counter-clockwise directions, respectively.

It should be appreciated that while the load control system 100 is described herein with reference to the single-pole load control system depicted in FIG. 1, that the remote control device 130 may be implemented in a "three-way" lighting system having two single-pole double-throw (SPDT) mechanical switches (e.g., a "three-way" switch) for controlling a single electrical load. For example, such a lighting system may include two remote control devices 130, with one remote control device 130 connected to the toggle actuator of each SPDT switch. The respective toggle actuator of each SPDT switch may be positioned such that the SPDT switches form a complete circuit between an AC power source and an electrical load before the remote control devices 130 are installed on the toggle actuators.

It should further be appreciated that the load control system 100 may include other types of load control devices and/or electrical loads that are configured to be controlled by one or more remote control devices (e.g., one or more remote control devices 130, 200, and/or 300). For example, the load control system 100 may include one or more of: a dimming ballast for driving a gas-discharge lamp; an LED driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a setpoint temperature of a heating, ventilation, and air-conditioning (HVAC) system; an air conditioner; a compressor; an electric baseboard heater controller; a controllable damper; a variable air volume controller; a fresh air intake controller; a ventilation controller; one or more hydraulic valves for use in radiators and radiant heating system; a humidity control unit; a humidifier; a dehumidifier; a water heater; a boiler controller; a pool pump; a refrigerator; a freezer; a television and/or computer monitor; a video camera; an audio system or amplifier; an elevator; a power supply; a generator; an electric charger, such as an electric vehicle charger; an alternative energy controller; and the like.

It should further still be appreciated that the remote device 200 is not limited to the example configuration of the base portion 202, rotating portion 204, and PCB 206 relative to each other as illustrated and described herein. For example, in accordance with an alternative configuration of the remote control device 200, the rotating portion 204 may be supported by the base portion 202 so as to be rotatable in opposed directions about the base portion 202, and the PCB 206 may be configured to be attached to the rotating portion 204. The rotating portion 204 may be rotatably attached to the base portion 202. For example, the base portion 202 may be configured such that the post 242 of the rotating portion 204 may be attached (e.g., rotatably attached) thereto. In this regard, the rotating portion 204 and the PCB 206 may be rotatable about the base portion 202 (e.g., in the clockwise or counterclockwise directions). In accordance with such an alternative configuration, the conductive interconnect member 256 may be configured to be attached the base portion 202 and the remote control device 200 may further include an electrical interconnect member, such as a slip ring, through which one or more electrical wires may be run to provide power to the PCB 206 from the battery 208 retained by the base portion 202.

It should further still be appreciated that the remote control device 200 is not limited to the example configuration using the interconnect member 256 in combination with an incremental rotary encoder circuit (e.g., the array 254 of circuit board pads 252 and corresponding circuit board traces 253 on the PCB 206) to provide one or more input signals to a control circuit of the remote control device 200, and that the remote control device 200 may be alternatively configured with other rotary adjustment components that may provide the one or more input signals to the control circuit. Similarly, the remote control device 300 is not limited to the example configuration using the rotary encoder circuit 304 to provide one or more input signals to the control circuit 302 of the remote control device 300, and may be alternatively configured with other rotary adjustment components that may provide the one or more input signals to the control circuit 302. Such alternative rotary adjustment components may include, for example, an accelerometer, an optical encoder, and/or a magnetic encoder (e.g., a Hall effect sensor), that may be configured to provide one or more input signals to respective control circuits of the remote control devices 200, 300.

It should further still be appreciated that while remote control devices that are configured to transmit wireless control signals to associated electrical load control devices are described herein with reference to rotary remote control devices (e.g., remote control devices 130, 200, and 300), that remote control devices may alternatively be configured with other suitable control interfaces, such as a slider or the like. Such a remote control device may include, for example, a base portion configured to mount over the toggle actuator of a switch, a slider operably coupled to the base portion, a wireless communication circuit, and a control circuit communicatively coupled to the slider and to the wireless communication circuit. The slider may be configured to move, for example linearly, with respect to the base portion. For example, the slider may be slidable, for example linearly, relative to the base portion. The base portion may thus be configured to slidably support the slider. The control circuit may be configured to translate a force applied to the control interface (e.g., a force applied to the slider) into a signal for controlling an associated load control device. The control circuit may be configured to cause the wireless communication circuit to transmit the signal.

What is claimed is:

1. A remote control device configured to be mounted over an installed light switch, the light switch having a switch actuator configured to extend through a faceplate, the switch actuator operable to control whether power is delivered to an electrical load, the remote control device comprising:

a base portion comprising a first opening that is configured to at least partially receive the switch actuator when the remote control device is mounted over the light switch, wherein the base portion comprises an arm configured to bias a surface of the switch actuator against a surface of the first opening to retain the base portion in a mounted position relative to the switch actuator;

a rotating portion configured to, when the remote control device is mounted over the light switch, receive a battery and a portion of the switch actuator, the rotating portion configured to be supported by and rotatable relative to the base portion;

a printed circuit board disposed in a cavity defined by the rotating portion;

a wireless communication circuit mounted to the printed circuit board; and a control circuit that is mounted to the printed circuit board and is responsive to movement of the rotating portion, and the control circuit communicatively coupled to the wireless communication circuit, the control circuit configured to, in response to movement of the rotating portion relative to the base portion, cause the wireless communication circuit to transmit a control signal that causes an adjustment of an amount of power delivered to the electrical load.

2. The remote control device of claim 1, wherein the battery is disposed in a space vacated by the switch actuator when the switch actuator is operated from a first position to a second position such that the switch actuator does not interfere with the battery.

3. The remote control device of claim 1, wherein the printed circuit board comprises a second opening configured to receive a portion of the switch actuator when the remote control device is mounted over the light switch.

4. The remote control device of claim 1, wherein the rotating portion defines a front wall and an annular side wall that extends from a perimeter of the front wall, wherein the front wall and the annular side wall define the cavity.

5. The remote control device of claim 1, wherein the control signal is indicative of a change in the amount of power delivered to the electrical load.

6. The remote control device of claim 5, wherein when the rotating portion rotates a distance that does not exceed a predetermined distance, the control signal is indicative of changing the amount of power delivered to the electrical load by a predetermined amount.

7. The remote control device of claim 5, wherein when the rotating portion rotates a distance that exceeds a predetermined distance, the control signal is indicative of continuously changing the amount of power delivered to the electrical load.

8. The remote control device of claim 1, wherein the rotating portion is configured to operably attach to the base portion such that the rotating portion is resiliently biasable toward the base portion.

9. The remote control device of claim 8, wherein when the rotating portion is biased toward the base portion, the control signal is indicative of power being applied to, or power being removed from, the electrical load.

10. The remote control device of claim 8, wherein the control circuit is further configured to, when the rotating portion is biased toward the base portion for a predetermined amount of time, initiate a configuration procedure to associate the remote control device with a load control device that is configured to control the amount of power delivered to the electrical load.

11. The remote control device of claim 1, wherein the surface of the switch actuator is a first surface of the switch actuator, and wherein the arm is located adjacent to a second surface of the switch actuator when the base portion is mounted over the switch actuator.

12. The remote control device of claim 11, wherein the arm creates friction forces between the arm and the second surface of the switch actuator and between the first surface of the switch actuator and the surface of the first opening to clamp the switch actuator within the first opening.

13. The remote control device of claim 11, wherein the base portion comprises a resilient strap that abuts the arm and is configured to bias the arm against the first surface of the switch actuator.

14. The remote control device of claim 1, wherein the base portion defines a recess that is configured to at least partially receive the battery.

15. The remote control device of claim 14, wherein the first opening is located adjacent to the recess such that the switch actuator does not interfere with the battery when the remote control device is mounted over the light switch.

16. The remote control device of claim 1, wherein the base portion is configured to, when the remote control device is mounted over the light switch, deter movement of the switch actuator when force is applied to the rotatable portion.

17. The remote control device of claim 1, further comprising a rotary encoder circuit mounted to the printed circuit board, the rotary encoder circuit configured to detect rotational movement of the rotating portion.

18. The remote control device of claim 17, wherein the rotary encoder circuit comprises a plurality of discrete input zones that are electrically connected.

19. The remote control device of claim 18, wherein the rotary encoder circuit comprises a plurality of electrically conductive circuit board pads arranged in an annular array proximate to a perimeter of the printed circuit board.

20. The remote control device of claim 17, wherein the rotary encoder circuit is configured to operate as an antenna.

* * * * *